Jan. 9, 1951        F. M. BRAWAND        2,537,326
LOG ARCH HOOK
Filed Sept. 24, 1948                                2 Sheets-Sheet 1
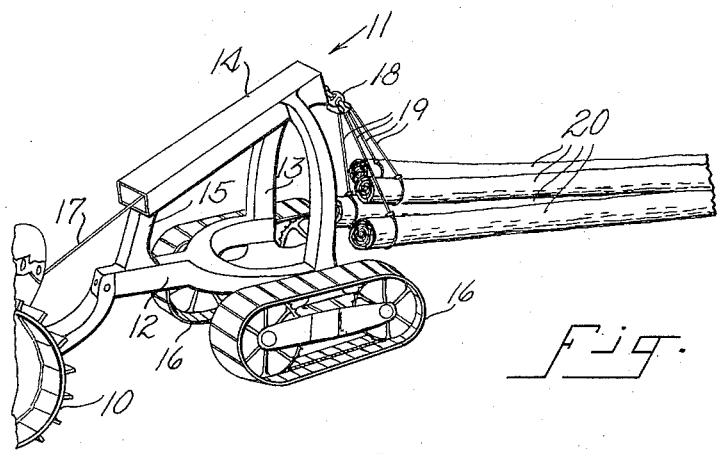
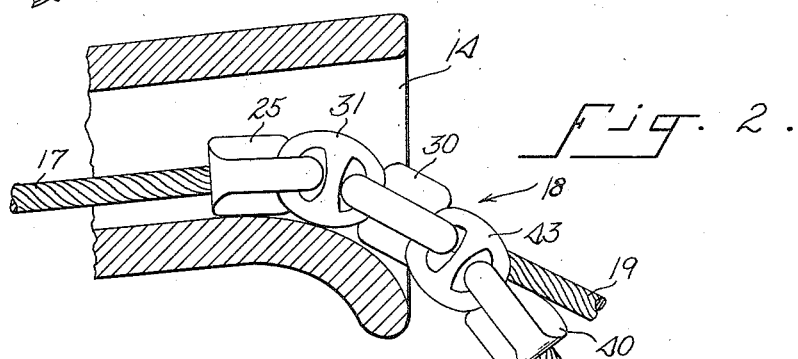
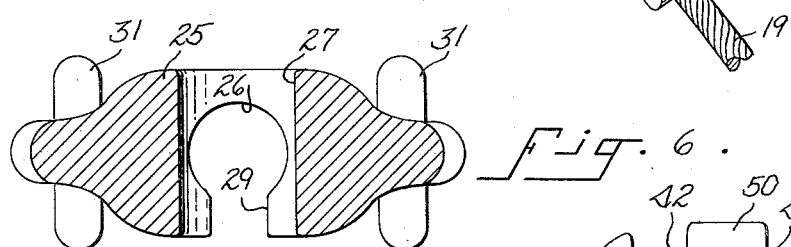
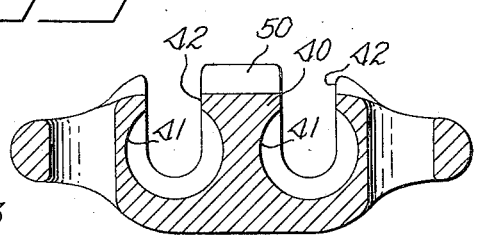
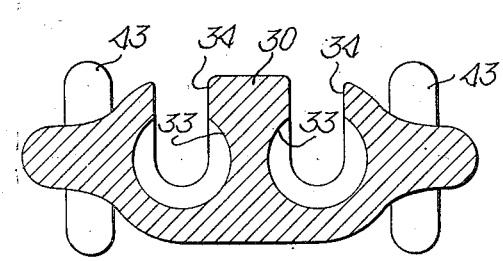
INVENTOR.
Franklin M. Brawand
BY
Buckhorn and Cheatham
Attorneys

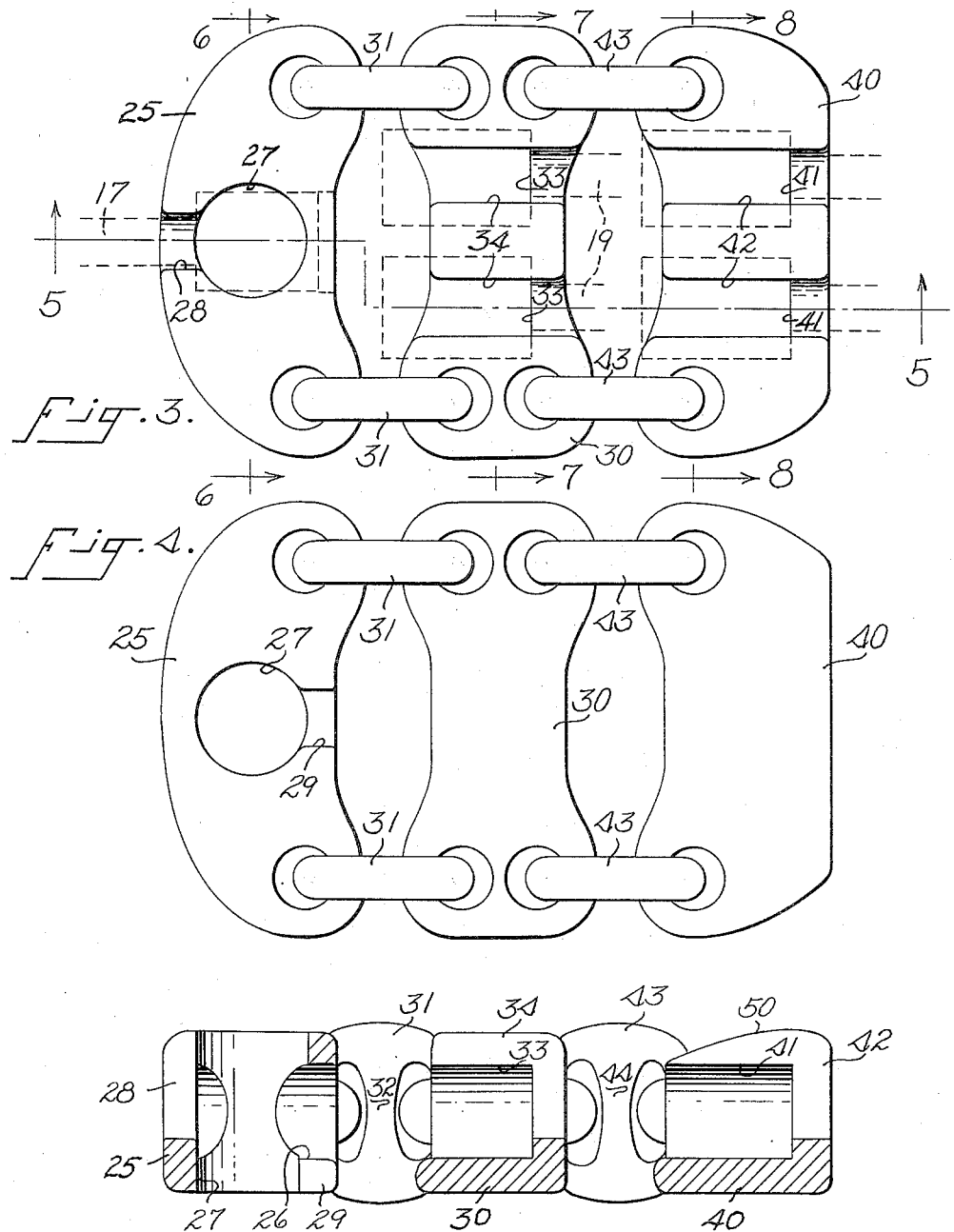

Patented Jan. 9, 1951

2,537,326

UNITED STATES PATENT OFFICE 2,537,326

LOG ARCH HOOK

Franklin M. Brawand, Metzger, Oreg.

Application September 24, 1948, Serial No. 50,936

9 Claims. (Cl. 24—123)

The present invention comprises a device for attaching a plurality of load cables to a traction cable. The device is primarily concerned with the attachment of logs to a transporting device known as a "log arch" which has come into increasing use in modern selective logging, but may be of utility in attaching the four corners of a cargo sling to a traction cable passing over a derrick boom, or in other similar or related equipment.

The principal field of utility at the present time appears to be in the logging industry. As time goes on, the stands of virgin timber are being reduced at a rate such that none will be in existence in this country within a relatively short period of time. The various governmental agencies, in cooperation with private owners of timber land, have instituted conservation measures including selective logging whereby mature trees are removed from stands of timber of mixed ages in order that a continuous supply of marketable timber may be grown on a given tract of land. In order that the younger trees may be left standing to produce later crops from such "timber farms," care must be exercised in removing the logs from the tract of land. Under previous methods of logging a great deal of the young standing timber was knocked down or otherwise destroyed, with the result that the log arch has come into prominence. The log arch comprises a device including a frame mounted upon a pair of wheels or track treads and which may be towed behind a tractor which may be equipped with a bulldozer blade at its forward end. A traction cable extends from a winch on the tractor through a guide or hawse hole on the log arch and is connected to a plurality of load cables each detachably secured about the end of a log. The load cables may be pulled into the hawse hole to raise the forward ends of the logs above the ground between the wheels of the log arch, whereupon the tractor operator may proceed through the trees, making his own road as he proceeds if it is necessary to do so. In order that he may round sharp corners between standing trees or build a road over or around other obstructions encountered in the rough terrain sometimes found in timber lands, he must at times drop the forward ends of the logs and permit the traction cable to pay out through the hawse hole as the tractor, with the log arch attached, proceeds forward on a road-building mission or backs and fills in order to turn a sharp corner. In order to pick up the load he may back the arch over the ends of the logs, taking up the slack of the traction cable as he does so, or may have to remain in position and "snake" the logs up to the stationary log arch. Regardless of the maneuvers required, it is apparent that the load cables are continuously being placed under and released from tension. Usually choker plugs are attached to the forward ends of such cables for attachment to butt hooks or other devices depending from the traction cable, and these are quite often separated with the result that valuable time is wasted in re-attaching the logs to the traction cable. Sometimes it is impossible for the tractor operator to re-attach a log to the traction cable, with the result that he has to abandon a log or find a crew of men who may be able to drop their regular duties temporarily while they re-assemble the load with the log arch. Also, in returning into the woods for a new load, choker cables are quite often displaced and lost among the underbrush and litter usually encountered in land which is being logged.

The present invention has for its principal object the provision of a log arch hook from which choker cables cannot become displaced at any time or under any condition unless the several parts thereof are intelligently manipulated into relative positions which cannot be achieved while the device is in use.

The objects and advantages of the present invention will be more readily understood by reference to the accompanying drawing wherein a preferred from of the invention is illustrated and in which like numerals refer to like parts throughout.

In the drawings Fig. 1 is a representation of a log arch in use for transporting a plurality of logs;

Fig. 2 is an enlarged vertical section through the rear tip of the guide or hawse hole on one form of log arch and showing the present invention in use therewith;

Fig. 3 is a plan view of the present invention showing choker cables associated therewith in dash outline;

Fig. 4 is a bottom view of the present invention;

Fig. 5 is a vertical section taken substantially along line 5—5 of Fig. 3;

Fig. 6 is a vertical section taken substantially along line 6—6 of Fig. 3;

Fig. 7 is a vertical section taken substantially along line 7—7 of Fig. 3; and

Fig. 8 is a vertical section taken substantially along line 8—8 of Fig. 3.

The present invention is illustrated in usage in Fig. 1 in connection with a tractor 10 having a log arch 11 attached thereto. The log arch comprises a tow bar 12 which is adapted to be pivotally attached to the drawbar of the tractor and to which is connected an A-frame 13 supporting the rear end of a guide or hawse 14, the front end of the guide being supported upon a riser 15 connected to the front end of the tow bar. The feet of the A-frame are connected to endless track devices 16. A traction cable 17 extends from a winch (not shown) mounted on the tractor through the hawse 14 and is detachably secured to a device 18 of the present invention. A plurality of load cables 19 are detachably secured to the device 18 and about the forward ends of a plurality of logs 20 which are being dragged over the terrain by the log arch. If the traction cable is unwound from the winch the logs will be lowered to rest upon the ground and may be left in such position while the tractor and log arch are being maneuvered about by the operator. He may return to a position closely adjacent the ends of the logs when he has re-aligned the assembly, taking up the slack of cable 17 as he does so until the forward ends of the logs are raised practically vertically, or he may drag the logs over the ground by remaining in a forward position and taking up the traction cable on the winch. The load cables 19 are preferably in the form known as choker cables, since such cables have come to be widely adopted and used throughout the logging industry. A choker cable comprises a woven wire cable having a cylindrical plug rigidly secured coaxially at one end, and means at its other end for securing the cable about a log. Similarly, the end of the traction cable 17 is preferably supplied with a choker plug, although the present invention may be utilized as a permanent attachment to a traction cable, or portions of the present invention may be incorporated in a device having other means for detachably securing a traction cable thereto.

In the preferred form of the present invention the device 18 comprises a plurality of substantially parallel crossbars linked together at their adjacent ends as by means of rings or chain links. The first or upper crossbar 25 comprises a traction crossbar to which the traction cable 17 is attached, preferably by means of a choker plug fitted into a choker plug socket 26. The first crossbar 25 is preferably in the shape of an isosceles triangle with the traction cable 17 extending from the apex thereof in line with the axis of symmetry of the triangle. Preferably the forward surfaces and the outer corners of the triangle are rounded so that the crossbar may be guided into the mouth of the hawse 14. The choker plug socket 26 extends inwardly from the base surface of the crossbar and has its bottom positioned adjacent the apex thereof with the socket concentrically surrounding the axis of symmetry. In order that a choker plug may be detachably secured thereto, the member 25 is provided with a transverse bore 27 extending from front to rear thereof and intersecting the choker plug socket. A first slot 28 extends from the upper surface of bore 27 at one end thereof to a point beyond the axis of symmetry so that the cable 17 may be slipped through the slot to a position in alignment with the socket 26. A second slot 29 connects the bottom wall of the opposite end of bore 27 with the mouth of the socket 26. In order to attach the traction cable 17 the choker plug on the end thereof is inserted from front to rear through the bore 27 until it is entirely beyond the rear surface. The cable 17 may now be moved through slot 28, thereby causing the portion thereof adjacent the choker plug to swing through slot 29 until the choker plug is in line with and beyond the mouth of the socket 26. Lengthwise movement of the cable 17 will now draw the choker plug thereon into the socket 26 to the position indicated in dotted outline in Fig. 3. It is to be noted that the choker plug is substantially as long as the socket 26 and is longer than the distance between the adjacent surfaces of the first and second crossbars. Therefore, slackening of the cable 17 may permit some endwise movement of the choker plug from the socket, but such movement will be arrested by the adjacent surface of the next crossbar or by the upper ends of choker plugs mounted thereon so that displacement from the socket is impossible, or insertion thereof into the socket is impossible, unless the first crossbar is manipulated relative to the next crossbar to assume a position at right angles thereto. When the device is in use the crossbars all lie in substantially the same plane, as seen in Fig. 5, or the device may assume a curved position, as seen in Fig. 2, in which each crossbar lies at less than 90 degrees to its neighbor so that the choker plugs are locked in position while in use.

In the preferred form of the device an upper load crossbar 30 is linked to the traction crossbar by a pair of rings 31, one at each side, connecting the base corners of the crossbar 25 to the upper corners of the crossbar 30. Each crossbar comprises a relatively thick body portion and relatively thin end fins having eyes therein for the reception of the linking members. The linking members preferably comprise the rings 31 and cross pieces 32 so that the members are chain link members of the type usually identified as anchor chain links. The cross pieces 32 are disposed between the adjacent corners of the crossbars so as to act as separators holding the crossbars from interference with each other, yet permitting their being shifted from the common plane which the crossbars will assume when the device is resting on a flat surface. The crossbar 30 is preferably provided with a pair of choker plug sockets 33, evenly spaced at each side of the prolongation of the axis of symmetry of the crossbar 25, so that a pair of load cables 19 will exert an even pull upon the device. The choker plug sockets 33 open toward the base surface of the first crossbar 25 and cable slots 34 extend thereinto through the front wall of the crossbar 30 and the bottoms of the sockets to points beyond the axes of the sockets. Choker plugs may be inserted when the crossbar 30 is shifted relative to the crossbar 25 to a position at right angles thereto, whereupon the cables 19 may be dropped through the slots 34 and the choker plugs drawn lengthwise into their sockets.

In the preferred form of the device a lower load crossbar 40 is provided, the same having a thickened body portion in which a pair of symmetrically disposed choker plug sockets 41 open toward the surface adjacent the crossbar 30 and are intersected by cable slots 42 extending through the front face and partially through the bottom surfaces of the sockets. The crossbar 40 comprises the thickened body portion in which the sockets 41 are located and relatively thin end fins having eyes for reception of a second pair of linking members 43, preferably comprising anchor chain links including cross pieces 44. The chain links 31 and 43 are preferably identical so as to reduce the number of different parts to a minimum, and are arranged in alignment with each other at each side and extend in planes normal to the longitudinal axes of the crossbars. The links may be elongated or round, as desired, but a desirable feature herein illustrated is in having the vertical dimensions thereof such that the upper and lower surfaces of the chain links extend above and below the crossbars. The links therefore provide bearing members which will ride upon the inner surfaces of the guide or hawse hole in the hawse 14, thus keeping the crossbars away from such supporting surfaces so as to reduce friction and permit free angular movement to positions such as illustrated in Fig. 2.

An important feature is illustrated in Figs. 5 and 8 wherein it is seen that the front surface 50 of the crossbar 40 tapers from its lower edge to the upper edge along the mouths of the sockets 41. Therefore, when four choker plug load cables are mounted in the device, the upper pair will be free to slide laterally across the lower crossbar 40, there being no sharp corners to catch and tear the strands of the upper pair of cables. This is important since the logs shift and roll relative to one another as they encounter obstacles and are dragged about sharp turns.

A feature of relative importance is that the crossbars are all of substantially equal length, and the chain links are arranged to follow one another. However, as various strains are placed thereon, one crossbar may shift laterally with respect to another. Therefore, the outer corners of the end fins of each crossbar are preferably rounded so as to eliminate any obstruction which would tend to prevent entry of the device into an opening such as the hawse hole in the hawse 14 of a log arch.

While I have herein illustrated the device as comprising means for attaching four cables, it is to be appreciated that the invention may achieve utility in other forms. For example, there may be only one choker plug socket in each of a greater number of crossbars, or there may be more than two choker plug sockets in each of a pair of load-attaching crossbars. The device as illustrated is sufficient for most purposes since there are four corners to a loading sling, since usually not more than four cables, or two cables having plugs at each end, are required for lifting any large load, and since four logs usually represent a maximum load for a log arch. For example, in Douglas fir country four logs forty feet long may represent a load of twenty to forty tons. In the event that smaller logs are being handled a single choker cable may be wrapped around several such logs, and in the event that larger logs (some trees being as much as twelve feet in diameter) are encountered it is impractical to handle more than one or two such logs at once. It is therefore believed that a device of this character having four load cable attaching sockets in two load crossbars will satisfy all demands.

It is to be remarked that the device of the present invention replaces a plurality of small butt hooks or other types of hooks at present employed in log arch operations. A plurality of such devices are awkward to handle and often become jammed with each other in the hawse hole or cannot be dragged into the hawse hole and thus prevent lifting the log ends to the extent required to clear some obstruction. The device as herein illustrated may be made in a plurality of different sizes, the largest of which, for association therewith of the largest sizes of load cables and load cable choker plugs presently employed in the logging industry, still being of such size as to be easily handled by the ordinary workman, such a device as presently designed weighing approximately thirty-five pounds.

Having illustrated and described a preferred embodiment of the invention, it will be apparent to those skilled in the art that the invention permits of modification in arrangement and detail. I claim as my invention all such modifications as come within the true spirit and scope of the appended claims.

I claim:

1. An article of the class described comprising a plurality of parallel crossbars, each of said crossbars having at least one socket therein opening toward an adjacent crossbar and a slot extending through the side wall and part of the bottom of the socket, and a plurality of chain links each connecting a corner of one crossbar to the adjacent corner of the next crossbar, said chain links lying in planes normal to said crossbars and projecting beyond the front and rear surfaces thereof whereby said crossbars are maintained above a supporting surface by the outer peripheries of said chain links.

2. An article of the class described comprising a first crossbar substantially in the shape of an isosceles triangle and having a choker plug socket therein for detachably securing thereto a traction cable, said socket lying along the axis of symmetry of the crossbar and opening toward the base thereof so that the traction cable extends through the apex thereof, and a plurality of other crossbars linked in parallel with said first crossbar, each of said other crossbars having a plurality of choker plug sockets therein for detachably securing thereto a plurality of load cables extending therefrom in the direction opposite to the direction of said traction cable.

3. An article of the class described comprising a first crossbar having substantially the shape of an isosceles triangle and having a choker plug socket therein extending from its base toward the apex thereof, an intermediate crossbar having at least one choker plug socket therein extending inwardly from the surface adjacent said first crossbar, a pair of rings linking the ends of said intermediate crossbar to the base ends of said first crossbar, a terminal crossbar having at least one choker plug socket therein extending inwardly from the surface adjacent said intermediate crossbar, and a second pair of rings linking the ends of said intermediate and terminal crossbars.

4. An article of the class described comprising a first crossbar having substantially the shape of an isosceles triangle and having means for attaching thereto a traction cable extending from the apex thereof in line with its axis of symmetry, an intermediate crossbar lying parallel to the base of said first crossbar and having a pair of choker plug sockets therein extending inwardly from the surface adjacent said base, one at each side of the prolongation of the axis of symmetry of said first crossbar, a pair of chain link members linking the base corners of said first crossbar to the adjacent corners of said intermediate crossbar, a terminal crossbar lying parallel to said base and having a pair of choker plug sockets therein extending inwardly from the surface adjacent said intermediate crossbar, one at each side of the prolongation of said axis of symmetry, and a second pair of chain link members linking the adjacent corners of said intermediate and terminal crossbars.

5. The construction set forth in claim 4 wherein said crossbars comprise relatively thick body portions in which said sockets are disposed and relatively thin end fins having eyes therein for the reception of said chain link members.

6. The construction set forth in claim 4 wherein said crossbars comprise relatively thick body portions in which said sockets are disposed and relatively thin end fins having eyes therein for the reception of said chain link members, and said chain link members normally lie in planes normal to the longitudinal axes of said crossbars.

7. The construction set forth in claim 4 wherein said crossbars comprise relatively thick body portions in which said sockets are disposed and relatively thin end fins having eyes therein for the reception of said chain link members, and said chain link members comprise cross pieces disposed between said crossbars.

8. The construction set forth in claim 4 wherein said crossbars comprise relatively thick body portions in which said sockets are disposed and relatively thin end fins having eyes therein for the reception of said chain link members, and said chain link members at each side are aligned with each other in planes normal to the longitudinal axes of said crossbars and project beyond the front and rear surfaces of said body portions.

9. The construction set forth in claim 4 wherein said crossbars comprise relatively thick body portions in which said sockets are disposed and relatively thin end fins having eyes therein for the reception of said chain link members, and at least the front surface of the body portion of said terminal crossbar slopes toward the intermediate crossbar.

FRANKLIN M. BRAWAND.

REFERENCES CITED

The following references are of record in the file of this patent:

UNITED STATES PATENTS

| Number | Name | Date |
| --- | --- | --- |
| 159,177 | Haworth | Jan. 26, 1875 |
| 612,374 | Baker et al. | Oct. 11, 1898 |
| 1,483,274 | Bouschor | Feb. 12, 1924 |
| 1,653,092 | Draper | Dec. 20, 1927 |
| 1,708,881 | Hartman | Apr. 9, 1929 |